United States Patent [19]
Redmond et al.

[11] Patent Number: 5,950,561
[45] Date of Patent: Sep. 14, 1999

[54] MILKING MACHINE UPRIGHT ATTACHMENT AND STORAGE SYSTEM

[76] Inventors: Daniel G. Redmond, Black St., Scipio Center, N.Y. 13147; John F. Redmond, 8442 Gray Ct., Arvada, Colo. 80003

[21] Appl. No.: 09/021,523

[22] Filed: Feb. 10, 1998

Related U.S. Application Data

[60] Provisional application No. 60/038,369, Feb. 13, 1997.

[51] Int. Cl.$^6$ ....................................................... A01J 5/00
[52] U.S. Cl. ..................................... 119/14.45; 119/14.23
[58] Field of Search .............................. 119/14.47, 14.45, 119/14.46, 14.48, 14.23, 14.51, 14.52

[56] References Cited

U.S. PATENT DOCUMENTS

| | | | |
|---|---|---|---|
| 2,512,926 | 6/1950 | Finn | 31/58 |
| 2,853,051 | 9/1958 | Bauer | 119/14.45 |
| 3,388,689 | 6/1968 | Patrick | 119/14.13 |
| 3,861,355 | 1/1975 | Johnson et al. | 119/14.08 |
| 3,929,103 | 12/1975 | Schluckbier | 119/14.08 |

*Primary Examiner*—Jack W. Lavinder
*Assistant Examiner*—Yvonne Abbott
*Attorney, Agent, or Firm*—Dean P. Edmundson

[57] ABSTRACT

This invention is a method and system of attaching, retracting and storing milking machines while maintaining the teatcups in an upright position. This method and system increases the current speed of milking on many dairies and offers improved sanitation. A cover is positioned to protect the teatcups from debris when it is in storage and there are several variations of mechanisms to hold the teatcups in position while attaching and retracting them. The invention allows milkers to place the machine on the cow with four teatcups at once instead of one at a time.

10 Claims, 13 Drawing Sheets

MILKING MACHINE UPRIGHT ATTACHMENT AND STORAGE SYSTEM

CROSS-REFERENCE TO RELATED APPLICATION

This application relates to and claims priority from our provisional application Ser. No. 60/038,369, filed Feb. 13, 1997.

FIELD OF THE INVENTION:

This invention relates to milking machines used in commercial dairy operations. It is a system and method that affects attachment, retraction and storage of milking machines.

BACKGROUND OF THE INVENTION

All businesses evolve over time. The commercial dairy production business has evolved into a capital and labor intensive industrial process. For these reasons, increased emphasis has been placed on efficient use of labor in the cow milking process. As larger herds are assembled, shift milking has become commonplace. Repetition of the same task for 8 hours presents the opportunity to refine the motions used in milking to allow enhanced human comfort by minimizing unnecessary motion. Milking parlors are used on many dairies. The design of modern parlors reflects the trend to organize the task of milking. Parlors have evolved from side-opening stalls, where cows stand nose-to-tail and are released individually, to a herringbone arrangement where cows are released as a string, to the parabone (a more oblique version of the herringbone) to the parallel parlor, where cows stand side by side, perpendicular to the operator pit and are released as a group. This is part of the effort to milk large groups as quickly and easily as possible. This concentration of cows in a small space comes at the expense of working space for the human operator. It also concentrates manure in the work area.

Mechanization used in milking parlors has also evolved from a basic milking machine plugged into a stainless steel milk line to a computer controlled integrated mechanism that may electronically identify each cow, record milk weights automatically, alert the operator to problems, detect the end of the milking process of a cow and remove the machine, cut out a sick animal, and sanitize each milking unit between cows.

It is the convergence of human labor, unpredictable and messy animal behavior, and the use of technology to milk cows that leads us to the present invention. Currently, cows enter one side of a milking parlor and jostle into position. After prepping the udder, the operator grips the bottom of the milking unit, releases the automatic take-off and moves the unit under the cow with the teat cups in a hanging down position to cut off vacuum leaks. The operator is required to reach down with his free hand to grasp and attach the four teat cups individually to the teats.

When the cow is done milking, the automatic take-off senses low milk flow and activates the retractor. Typically, the retractor is attached by a chain or cord to the top of the claw, which retracts it in an upright position while the teat cups fall down or on the bottom of the claw which inverts the unit. Both methods allow the teat cups to drag across the floor or the leg of the cow when removed, spilling milk on the platform and picking up manure.

Neither of these rest positions provide a convenient starting point for the operator as they begin to apply the machine to the next cow. In the first case, the unit dangles freely and occupies a maximum amount of working space. In the second case, the operator must turn the machine over before attaching it. In both instances, the operator must wrestle the unit into position before it may be attached. In parlors where 130–150 cows per man per hour are to be milked, this wrestling is a waste of time and motion. This wrestling motion and a constant push for improved sanitation has led to our development of the upright milking technology. This technology is adaptable to most modern milking parlor installations.

SUMMARY OF THE INVENTION

The present invention is an improved retraction system for use with commercial automatic milking machine take-offs. The Present Invention provides several variations of design that all accomplish the following goals:

1. Retract the teatcups in an upright manner preventing them from falling down and contacting the cow's legs or the floor.
2. Stores the teatcups in an upright position to allow the operator to grasp them quickly and easily.
3. Presents the teatcups in such a way as to allow the milker to place them on the cow without first dropping them down towards the floor.
4. Protects the teatcups from having foreign matter drop in them when they are in the retracted position.
5. Allows convenient handling of teatcups in the upright position by use of handles, levers or vacuum valves to make application of the milking unit convenient and fast.

It is this upright storage that allows improved sanitation in three ways:

1. By keeping the teatcups upright as the unit is retracted they are not dragged across the floor or the cow, both of which may be dirty.
2. Where backflush systems are used, sanitation is improved by the flooding that occurs inside the unit cleaning all milk contact surfaces. In addition, as the solution is pumped up through the inflations and out the ends, a washing of the outside of the teat cups occurs.
3. In the traditional method of milking machine attachment, the person attaching the unit grasps the base of the unit and allows the teatcups to fall toward the floor where they often suck up bedding and manure while they are being attached. By keeping the teatcups upright as they are attached they never come in contact with the floor and remain clean.

A second advantage of this method is that it speeds up attachment of the unit to the cow. Traditionally the worker holds the base of the unit with one hand and attaches the teatcups one at a time to the cow's teats. In our model the worker grasps or controls all four teatcups (two in each hand) and, keeping them in a vertical position, applies more than one teatcup at a time. This saves significant time over traditional methods and provides a more effective ergonomic environment as well. Upright storage also provides the person milking with a less cluttered work area and more convenient application of the milking machine to the next cow.

DETAILED DESCRIPTION OF THE INVENTION

The following are specific examples of the types of design that might be developed to support this method of upright storage and attachment of a milking unit 10 including a plurality of teatcups 12. They are included to illustrate the technique that we,are patenting.

Figure 1:
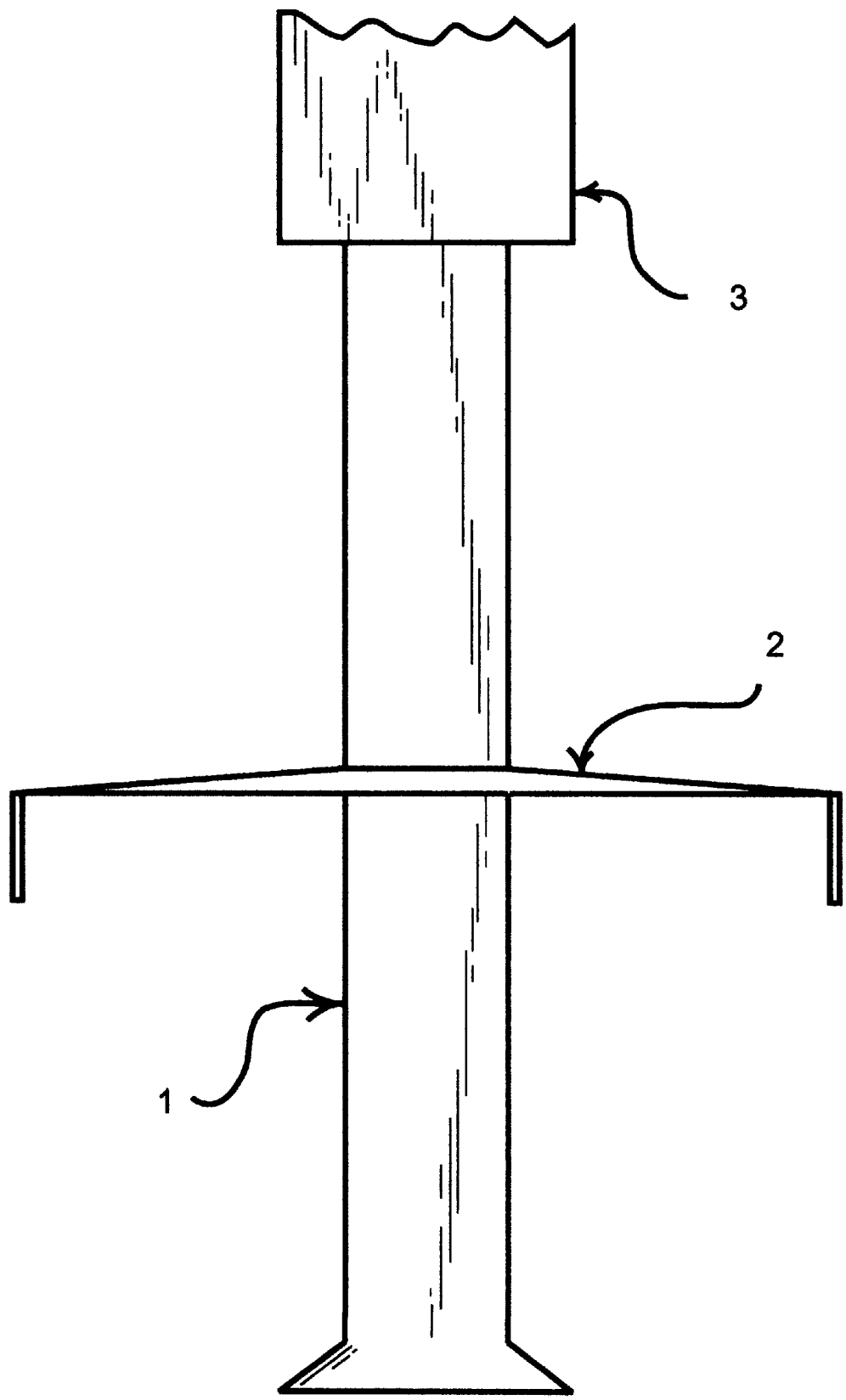
FIG. 1 shows the guide tube with flared end and protective disk.
Figure 2:
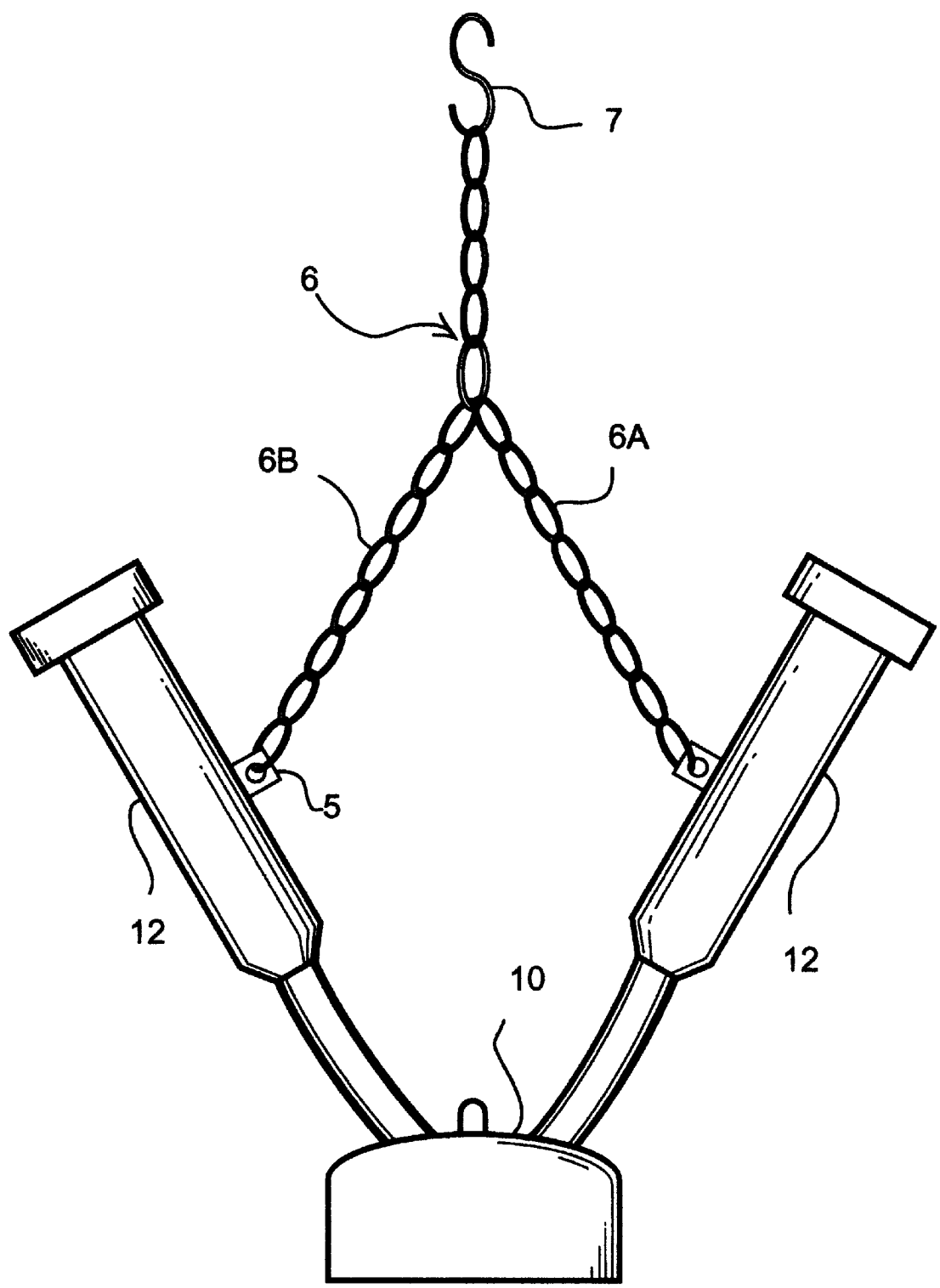
FIG. 2 shows the harness as installed on a milking machine.
Figure 3:
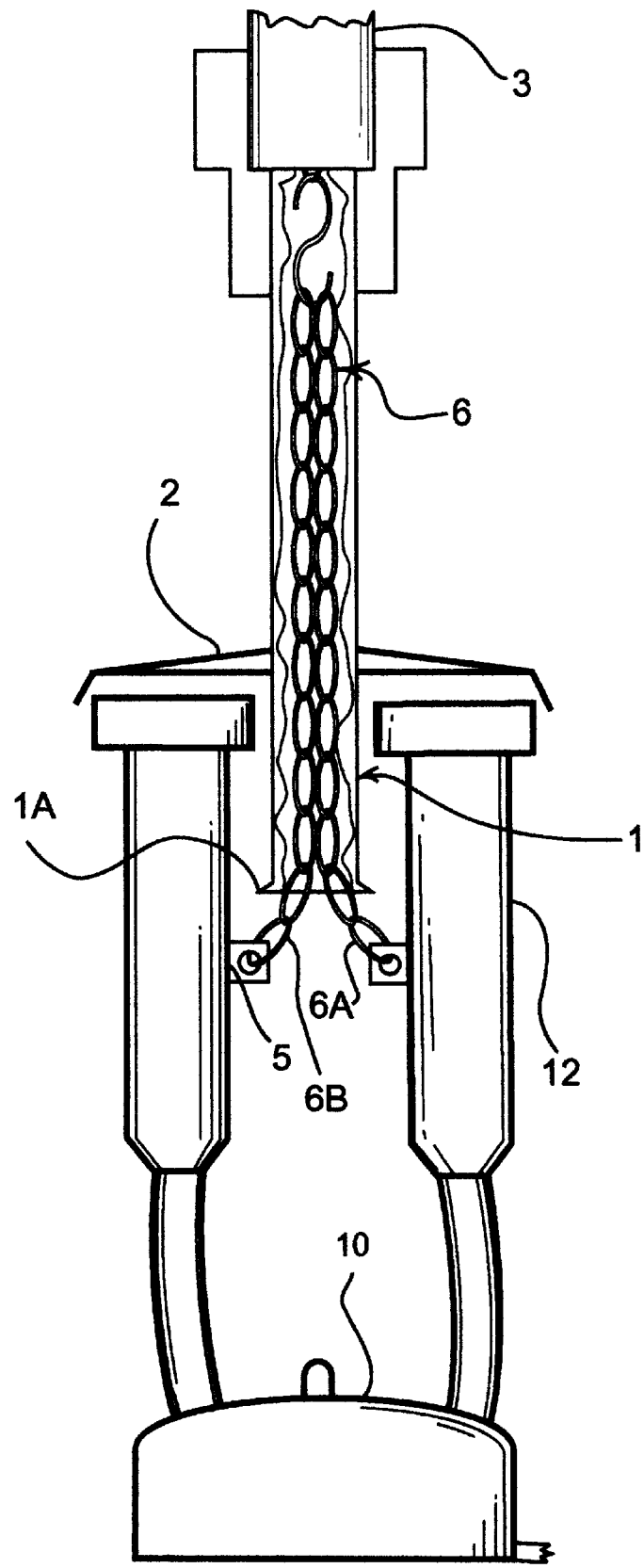
FIG. 3 shows the unit in a retracted or rest position.
Figure 4:
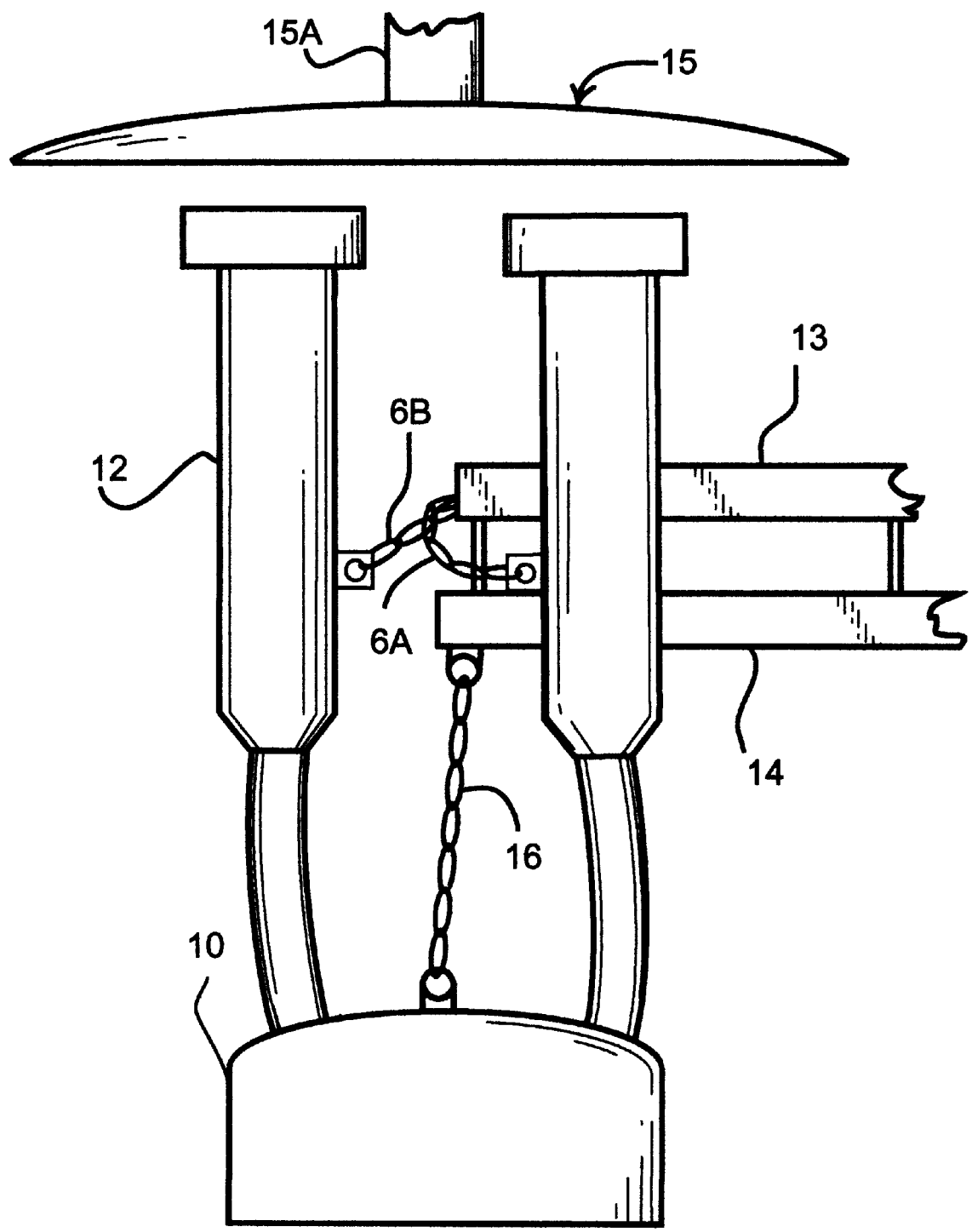
FIGS. 4 and 5 show the invention as it would be installed on existing arm-style automatic take-offs.
Figure 5:
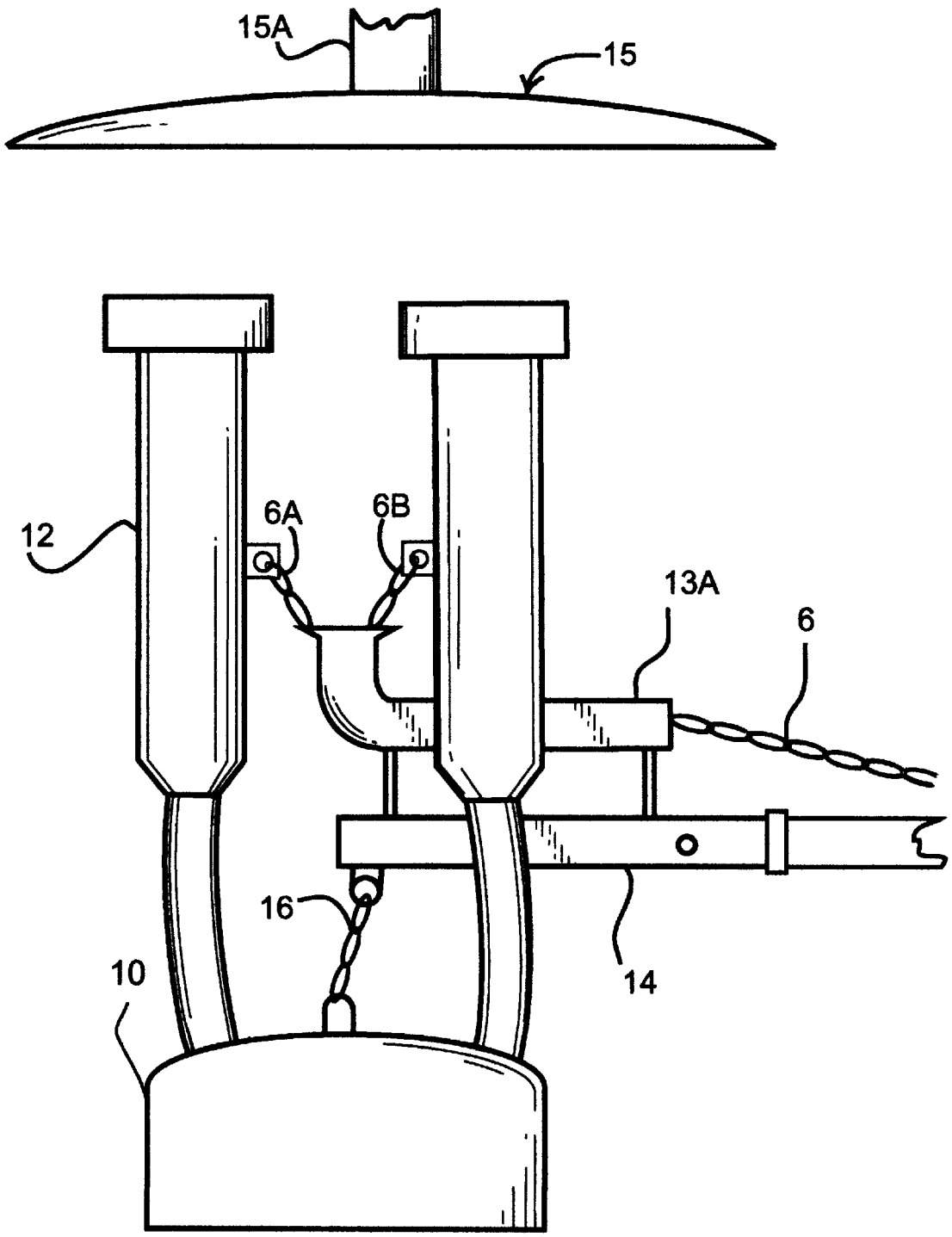

FIG. 1–FIG. 3 illustrate one embodiment of a system of the invention for providing upright attachment and storage of the teatcups of a conventional milking unit. The system includes a four strand harness 6 made of stainless steel chain or cable (with lower ends 6A and 6B shown)and is long enough to allow the teatcups to extend to accommodate large uddered cows. It is installed between welded loops 5 on the teatcups 12 and the clip 7 on the end of the cord or chain of the retractor 3. The second part of the sling is the hat or cover, which is comprised of a stainless guide tube 1 and a round stainless deflector or disc 2 which may be secured to the tube. In a typical installation, the stainless guide tube will be positioned in the center of the deflector directly below the existing retractor mechanism 3.

As the cord/chain is retracted, it passes through the stainless tube and draws the harness into the tube 1. As it approaches the home position, the bottom 1A of the stainless tube pulls the four strands of the harness together, gathering the teatcups neatly under the domed disc 2 where they are protected from debris (flies, manure, dirt, water) still in the upright position. The teatcups can be easily cleaned by backflushing, (when employed), occupying a minimum of working space, and positioned for convenient attachment to the next cow.

This technology may also be used by dairymen utilizing automatic takeoffs equipped with mechanical arms. In this case, a guide tube 13 will be positioned on the top side of the end arm link 14 of an arm retractor unit that supports the milking unit 10 (by linkage 16). The cover or deflector 15 will be positioned in a suitable spot (e.g. attached to the stallwork by means of bracket 15A).

Another application for use in parallel parlors may include a take-off arm 14 with the modified guide tube 13A with a 90 degree bend mounted horizontally on the outer end of the end-link of the mechanical arm 14.

Other variations include the use of wire, cable, nylon rope, or plastic or steel rods in the harness in place of the stainless steel chain. Small handles can also be attached to each teatcup for easier application to the udder.

Figure 6A:
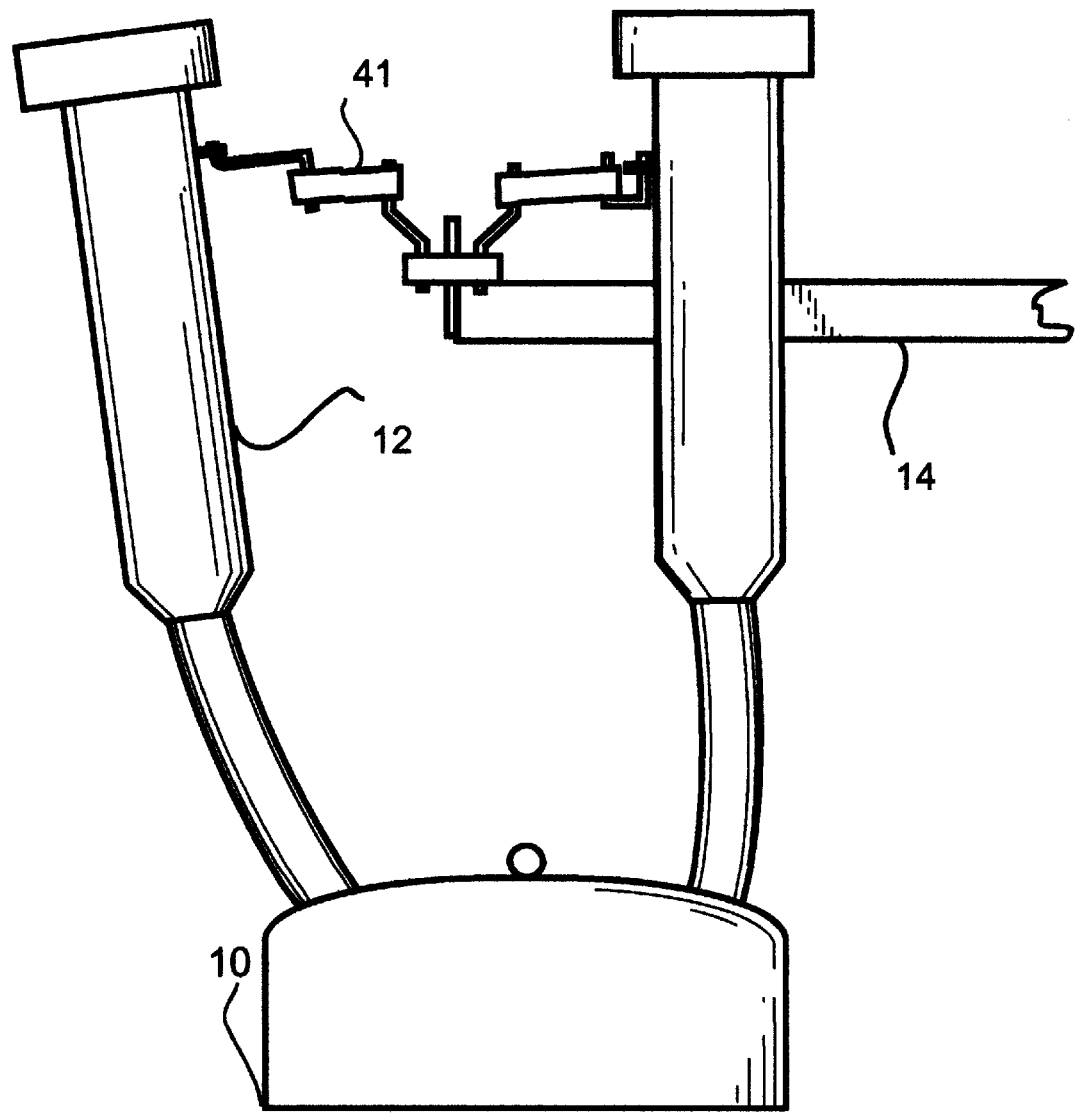
FIGS. 6A and 6B show each teatcup with flexible jointed arms that replace the chains.
Figure 6B:
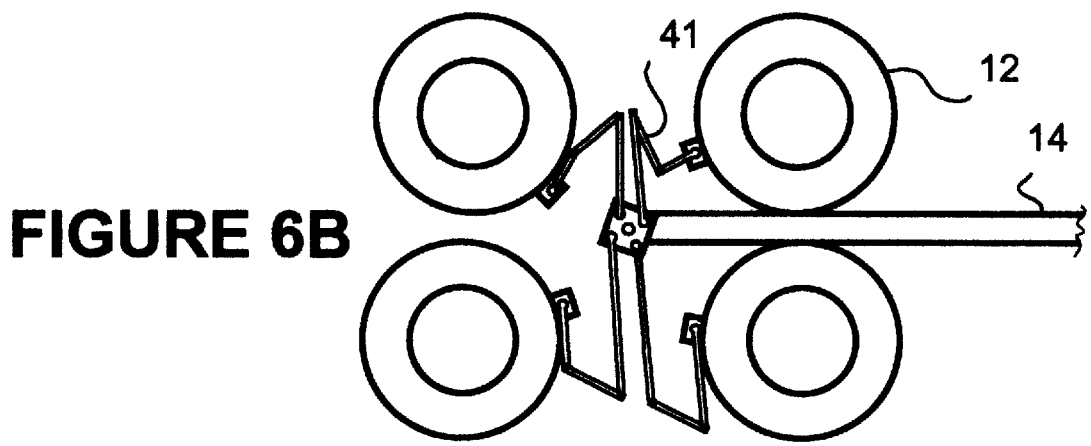
Figure 7:
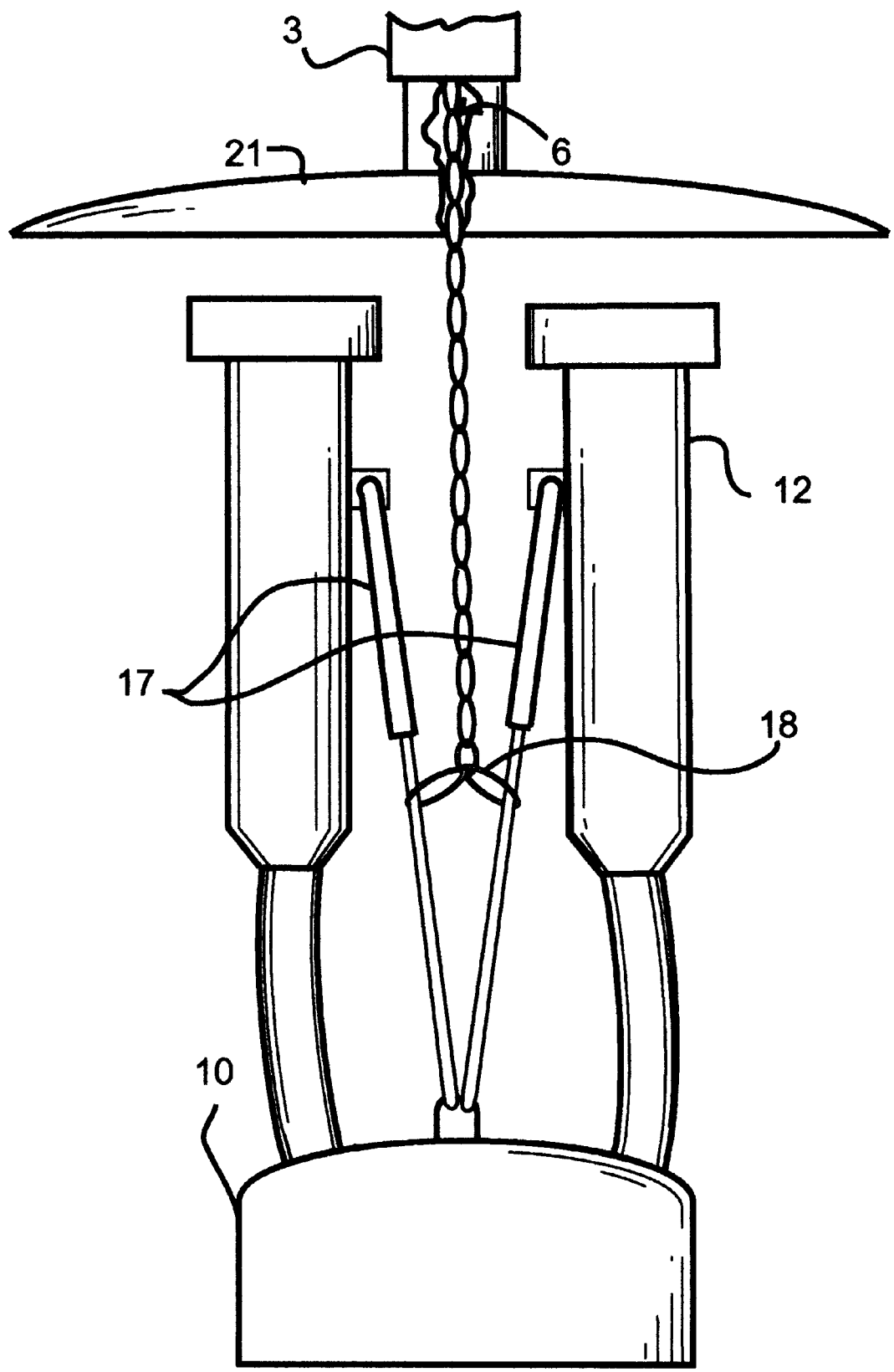
FIG. 7 shows rods instead of chains, with the rods secured to the milking unit. The center tube is not needed with this application.
Figure 8:
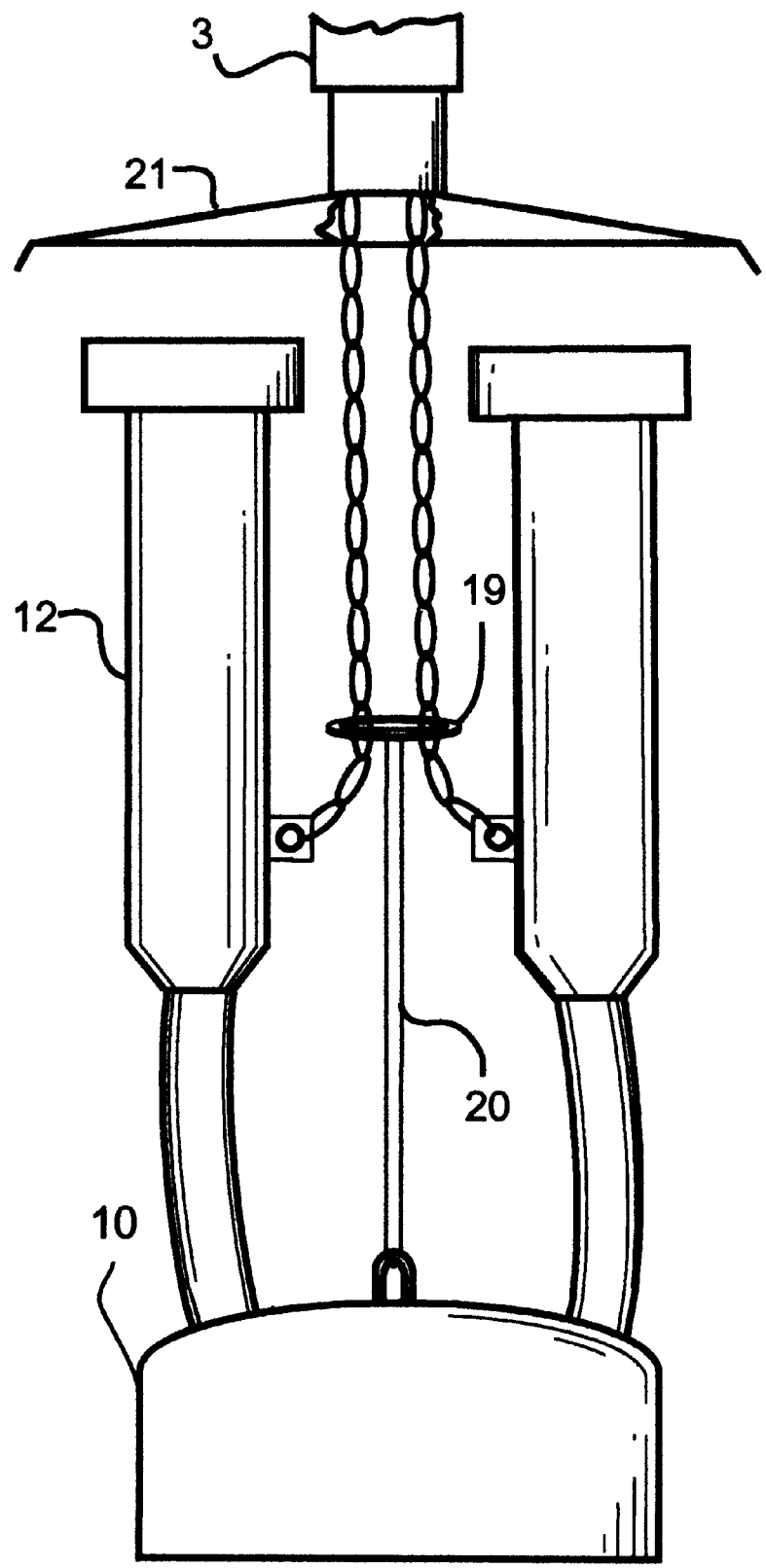
FIG. 8 shows a rigid center pole with a ring that the chains retract through replacing the center tube.
Figure 9:
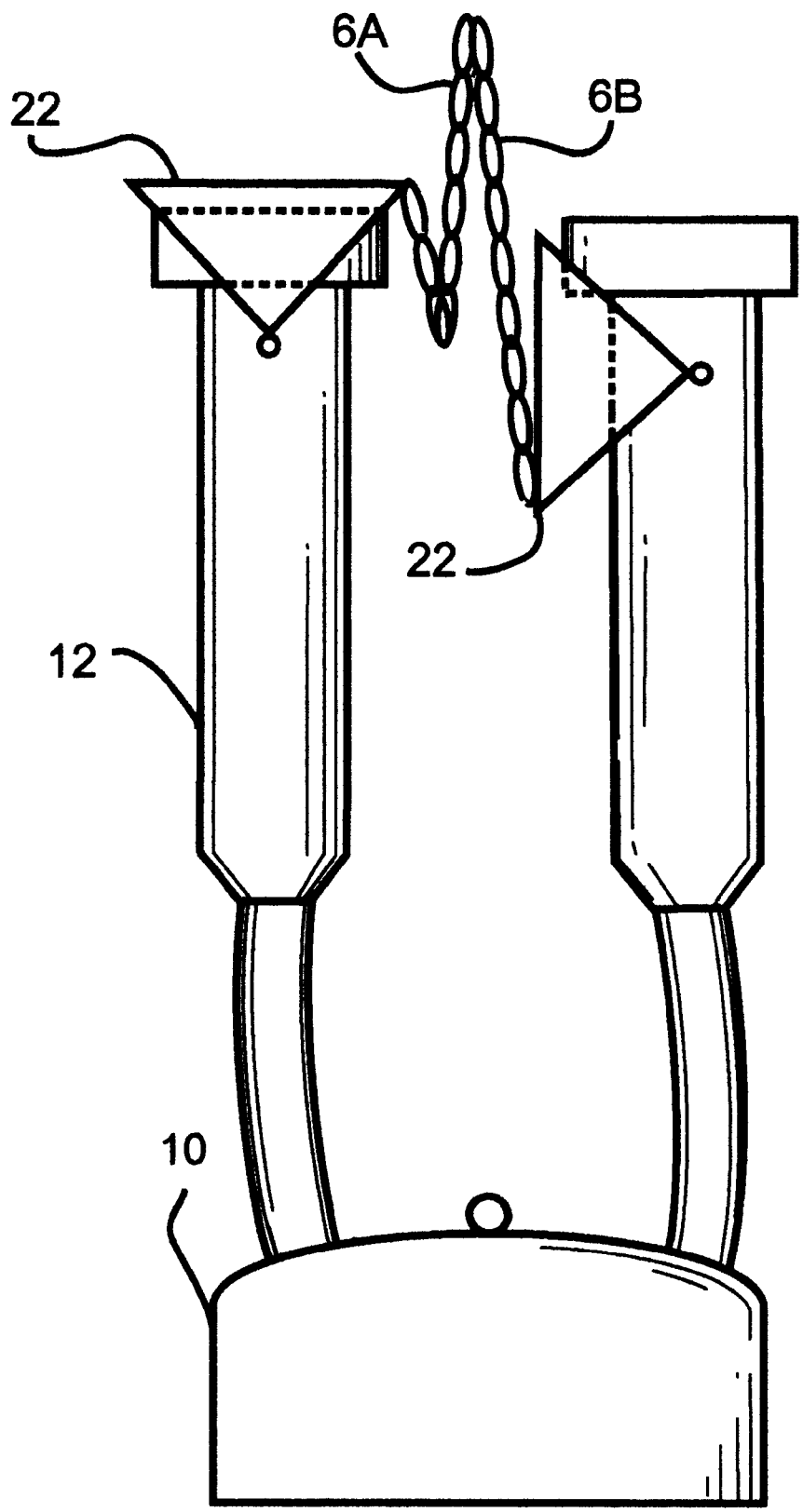
FIG. 9 shows teatcup mounted individual covers that have the chains attached to them.
Figure 10A:
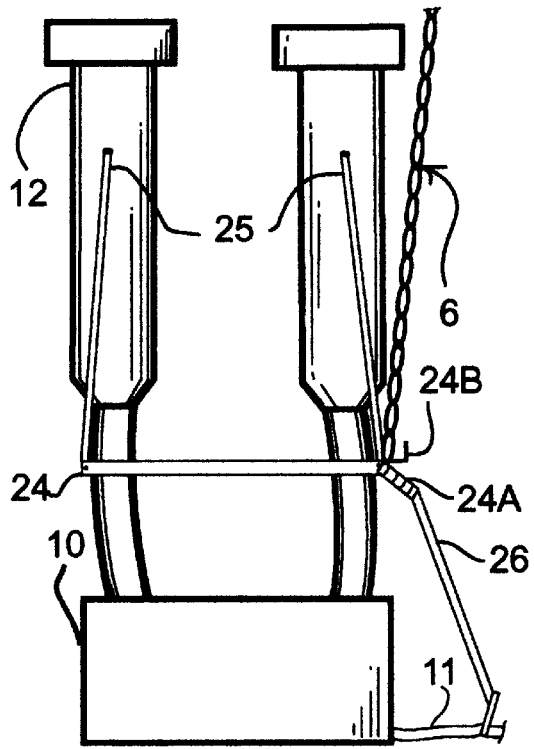
FIGS. 10A through 10D show horizontal tubes with rods attached that hold the teatcups up. The unit includes handles to make attaching the unit easier.
Figure 10B:
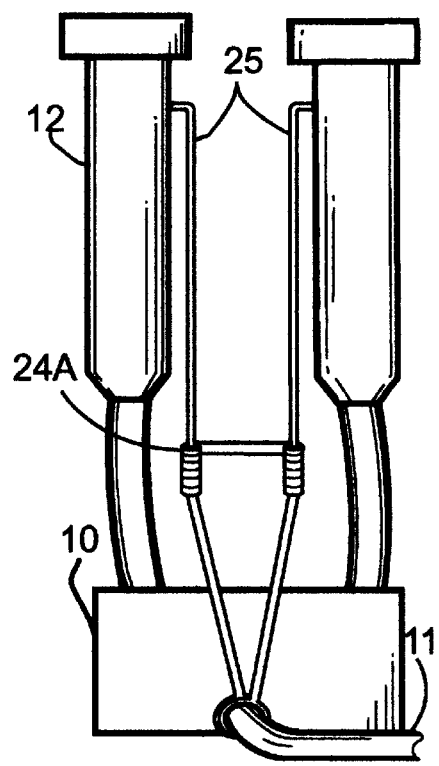
Figure 10C:
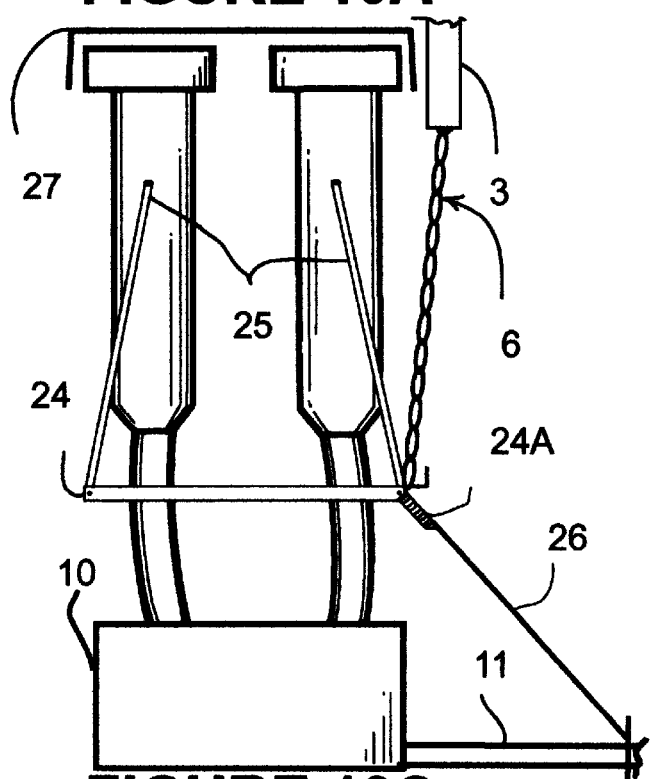
Figure 10D:
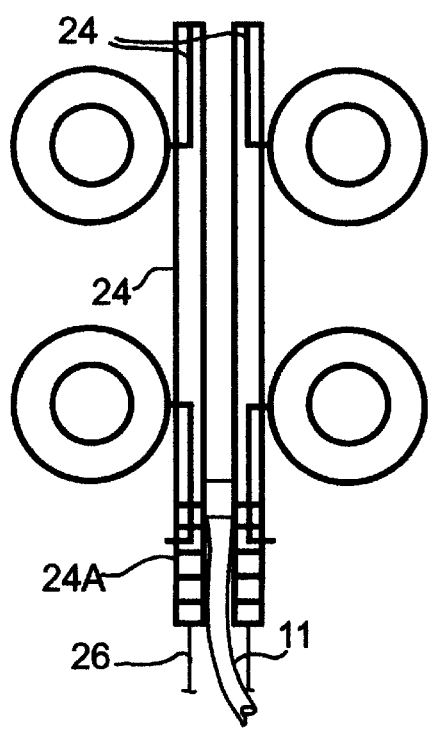

Another major embodiment of this idea is a rigid holder that serves as an adjustable arm 41 for each teatcup shown in FIGS. 6A and 6B. These arms replace the chains in the previous example and can be used with a rope or chain retractor or on an arm retractor.

Telescoping rods 17 can replace the multiple chains and be attached to the top of the milking unit 10. A ring 18 is attached to the retractor rope or chain and slides up the rods to retract the teatcups when the chain or rope is retracted.

A variation on the previous design is to attach a rigid ring 19 to the upper end of a rod 20 at a point 4 inches above the milk unit 10. The individual chains 6A and 6B slide through the ring 19 and center the teatcups under the cover 21.

An another design for the ▌hat▌ is to have an individual cover 22 pivotally attached to each teatcup and also attached to an individual chain 6A, 6B etc. The retraction process pivots the cover 22 over the open end of the teatcup. The cover drops to its open position when the retractor is released, thereby enabling the teatcups to be applied to the udder.

Another design utilizes handles that place the machine on the cow without having to reach under or near the legs of the cow. This embodiment is shown in FIGS. 10A through 10D. There are two elongated tubes 24, each having a handle portion 24A at one end. Two rods 25 extend from each tube 24 upwardly and are attached separately to a respective teatcup 12. Each rod 25 is pivotally connected to the tube 24 in a manner such that each rod pivots forwardly or rearwardly, as controlled by an appropriate linkage in the tube 24 via a control lever 24B. A rigid rod 26 is connected between the handle 24A and the milkhose 11 to provide a counter-balance force for the unit. The operator grasps the two handles 24A and by manipulating them relative to each other the teatcups are positioned to be placed on the cow. When the unit is retracted it is pulled under a dome or cover 27 (FIG. 10C) to protect the teatcups.

This system allows the teatcups to remain upright and attachment of the teatcups without reaching under the cow. The teatcups are balanced by the milking unit 10 and hose 11. Extension hoses 33 are positioned inside the tubes to reduce clutter and improve sanitation.

Figure 11A:
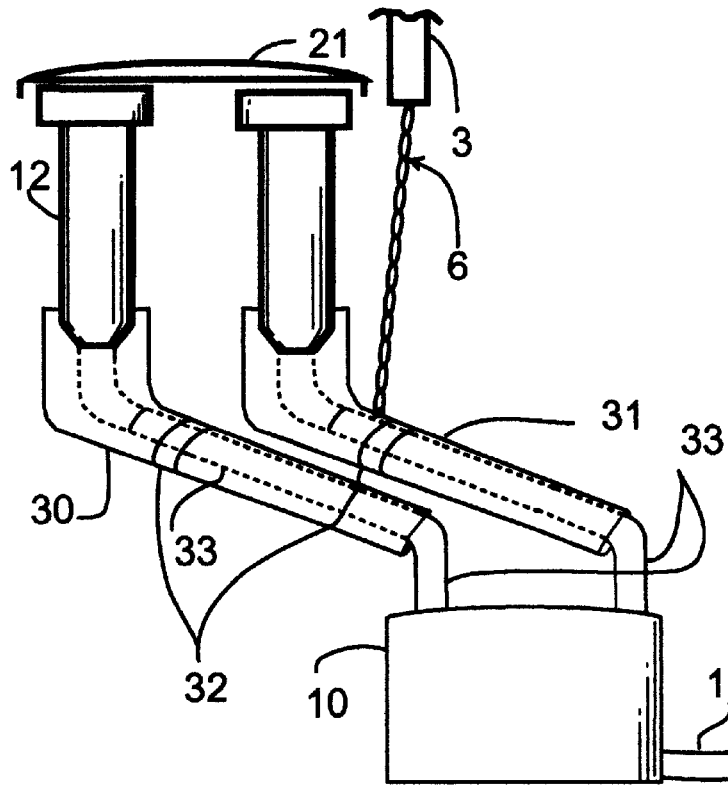
FIGS. 11A and 11B show a support tube which enables the milking unit and hoses to remain away from the cow.
Figure 11B:
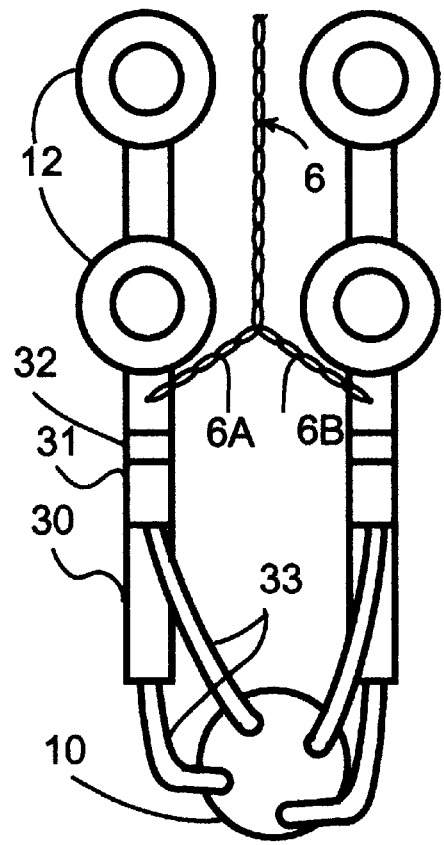

Another embodiment of the system of this invention is illustrated in FIGS. 11A and 11B. In this version each teatcup 12 is attached or supported on the outer end of an elongated tube, 30 for front teatcups and 31 rear teatcups. Each pair of tubes 30 and 31 are connected together by means of straps 32 which enable the tubes 30 and 31 to slide relative to each other, as may be necessary in order to properly position the teatcups for attachment to the udder.

Figure 12:
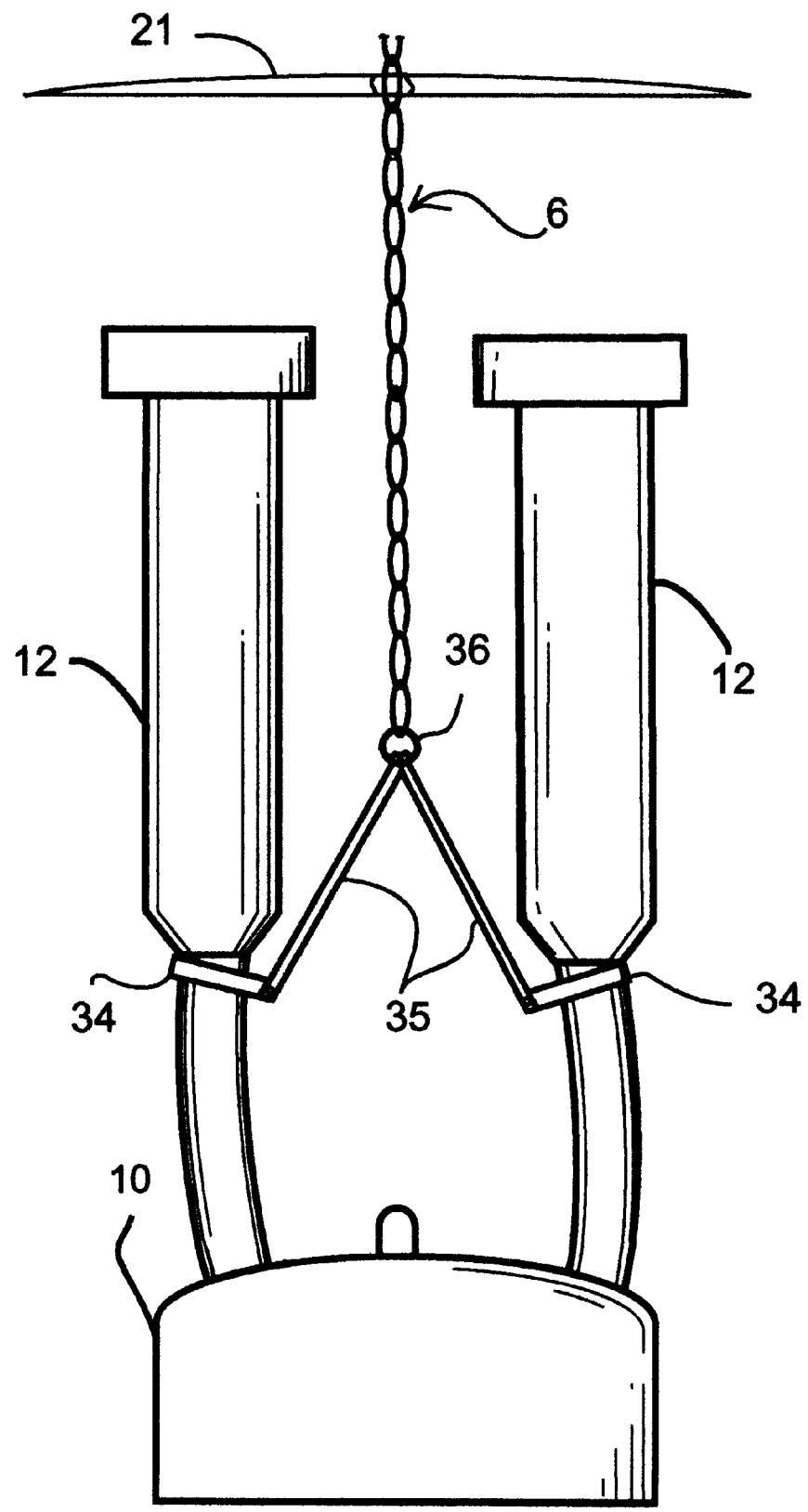
FIG. 12 is a side elevational view showing another embodiment of harness means useful in this invention.

Another embodiment of harness means is shown in FIG. 12 comprising a loop or ring 34 surrounding and loosely engaging each teatcup 12. A rod 35 is connected between each ring 34 and another ring or link 36 on the lower end of the strand harness or retractor chain 6. When the chain 6 is retracted, each rod 35 and ring 34 will support or hold a respective teatcup in an upright position under a cover or hat 21.

Figure 13A:
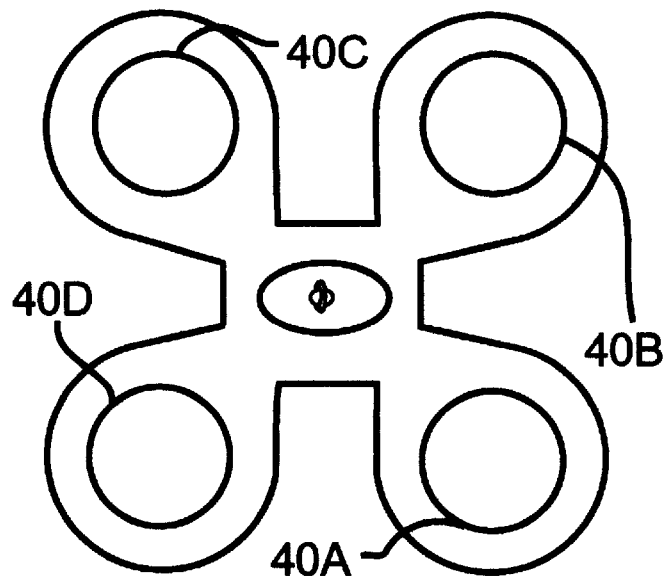
FIGS. 13A and 13B show another embodiment of a harness comprising a unitary frame with openings to receive individual teatcups to support them in an upright manner.
Figure 13B:
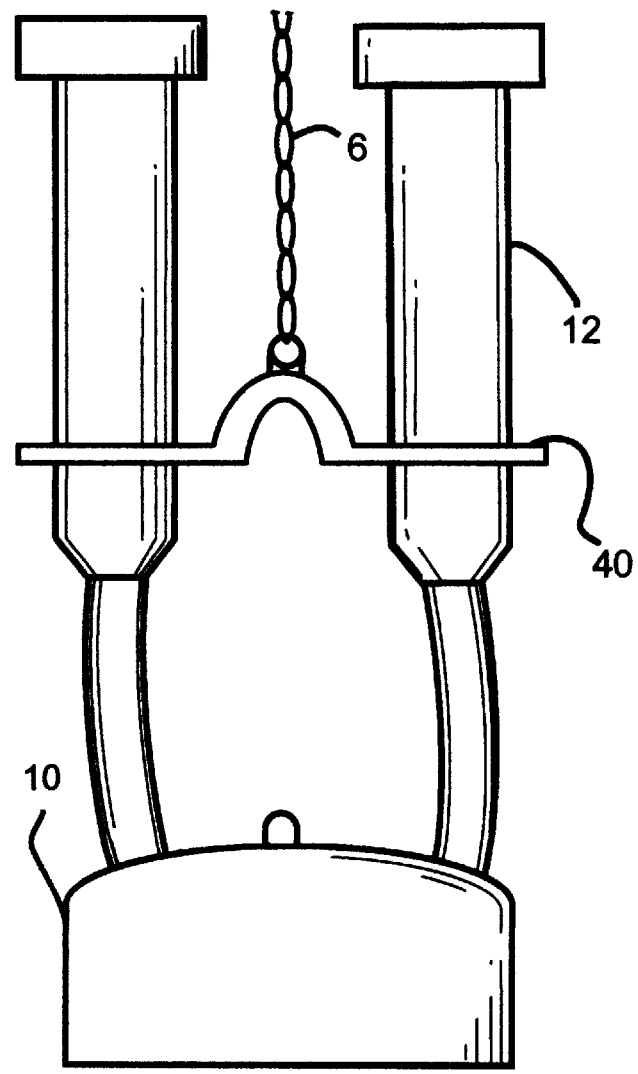

Yet another version of harness means useful in this invention is illustrated in FIGS. 13A and 13B comprising a frame member 40 having a plurality openings 40A through 40D. Each opening is adapted to receive an individual teatcup 12. The retractor chain 6 is secured to the center of the frame 40. When the retractor chain is retracted, the frame 40 slides upwardly along each teatcup to draw all of the teatcups towards each other and to support them in an upright manner and positioned under an appropriate hat or cover for protection until the next milking cycle.

We expect the best performance of our technology to be realized where the dairy manager is committed to a high degree of performance from the milking parlor. While the attributes of the upright storage and attachment will be appreciated most in large parallel milking parlors where speed of milking and convenience are expected, the improved sanitation will be noticed in all parlor configurations.

What is claimed is:

1. A milking machine upright attachment and storage system for use with a milking unit carrying a plurality of teatcups each having an open end, the system comprising:
    (a) retractor means attached to the milking unit and being movable between extended and retracted positions; and
    (b) harness means attached to each of said teatcups and also to said retractor means; said harness means being adapted to support said teatcups in an upright position when said retractor means is moved to said retracted position.

2. A system in accordance with claim 1, wherein said harness means comprises flexible chains.

3. A system in accordance with claim 2, further comprising a loop carried by each teatcup; and wherein one of said chains is connected to said loop.

4. A system in accordance with claim 1, further comprising cover means for covering said teatcups when said retractor means is in said retracted position.

5. A system in accordance with claim 4, wherein said cover means comprises an elongated tube and a disk member secured around said tube; wherein said harness means extends through said tube; wherein when said retractor means is in said retracted position, said teatcups are positioned upright beneath said disk member.

6. A system in accordance with claim 4, wherein said cover means comprises a cover member pivotally connected to each said teatcup and also connected to said harness means; wherein when said retractor means moves to said retracted position, said cover member pivots to a position covering the open end of a said teatcup.

7. A system in accordance with claim 4, wherein said harness means extends through said cover means.

8. A system in accordance with claim 1, further comprising a frame member having a plurality of openings therein which are larger than said teatcups; wherein each said teatcup is positioned within one of said openings in said frame member; wherein said frame member is connected to said harness member; wherein when said retractor means moves to said retracted position, said frame member moves upwardly to support said teatcups in an upright position.

9. A system in accordance with claim 1, wherein said harness means comprises (a) a plate member, and (b) linkage means conncected between said plate member and each of said teatcups; wherein when said plate member is retracted by said retractor means, said linkage means is adapted to support each teatcup in an upright position as said linkage means collapses toward said plate member.

10. A method for supporting the teatcups of a milking unit in an upright manner when they are removed from a cow's udder, the method comprising the steps of:
    (a) providing retractor means which is movable between extended and retracted positions;
    (b) providing harness means;
    (c) attaching said harness means between said teatcups and said retractor means; wherein said harness means is adapted to support each of said teatcups in an upright position when said retractor means is moved to said retracted position.

* * * * *